(12) United States Patent
Lee

(10) Patent No.: US 11,740,835 B2
(45) Date of Patent: Aug. 29, 2023

(54) PRIORITIZED QUEUE MANAGEMENT

(71) Applicant: Rapid7, Inc., Boston, MA (US)

(72) Inventor: Austin Formosa Lee, Burbank, CA (US)

(73) Assignee: Rapid7, Inc., Boston, MA (US)

( * ) Notice: Subject to any disclaimer, the term of this patent is extended or adjusted under 35 U.S.C. 154(b) by 32 days.

(21) Appl. No.: 17/335,410

(22) Filed: Jun. 1, 2021

(65) Prior Publication Data

US 2021/0286560 A1    Sep. 16, 2021

Related U.S. Application Data

(63) Continuation of application No. 16/685,633, filed on Nov. 15, 2019, now Pat. No. 11,055,027.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,094,694 A | 7/2000 | Hickson et al. | |
| 6,182,120 B1* | 1/2001 | Beaulieu | G06F 9/4881 709/200 |
| 6,501,733 B1* | 12/2002 | Falco | H04L 47/805 370/429 |
| 6,934,950 B1* | 8/2005 | Tuel, Jr. | G06F 9/546 718/100 |
| 7,035,852 B2 | 4/2006 | Hopewell et al. | |
| 7,127,507 B1* | 10/2006 | Clark | H04L 47/30 709/224 |
| 7,543,181 B2 | 6/2009 | Buxton et al. | |
| 7,680,793 B2* | 3/2010 | Wong | G06F 16/2365 707/999.008 |
| 7,849,468 B2 | 12/2010 | Dinh et al. | |
| 8,627,333 B2* | 1/2014 | Chen | G06F 9/546 719/312 |
| 2018/0013714 A1 | 1/2018 | Leach et al. | |
| 2020/0120541 A1* | 4/2020 | Wang | H04L 67/60 |
| 2021/0089336 A1* | 3/2021 | Jaini | G06F 8/36 |

* cited by examiner

*Primary Examiner* — Elias Mamo
(74) *Attorney, Agent, or Firm* — Ashwin Anand

(57) ABSTRACT

Methods and systems for managing queues. The disclosed methods involve receiving, at an interface, a request to store a message in a queue, storing the message as a row in a key-value store database, extracting at least one attribute from the message; and selecting the message for processing based on the at least one extracted attribute.

20 Claims, 4 Drawing Sheets

| QueueName (org. + name) | Message UUID | AttrA | AttrB | AttrC |
|---|---|---|---|---|
| ... | ... | ... | ... | ... |
| ... | ... | ... | ... | ... |
| ... | ... | ... | ... | ... |
| QueueName (org. + name) | Message UUID | AttrA | AttrB | AttrC |
| ... | ... | ... | ... | ... |
| ... | ... | ... | ... | ... |
| ... | ... | ... | ... | ... |
| QueueName (org. + name) | Message UUID | AttrA | AttrB | AttrC |
| ... | ... | ... | ... | ... |
| ... | ... | ... | ... | ... |
| ... | ... | ... | ... | ... |
| QueueName (org. + name) | Message UUID | AttrA | AttrB | AttrC |
| ... | ... | ... | ... | ... |
| ... | ... | ... | ... | ... |
| ... | ... | ... | ... | ... |

200

PRIORITIZED QUEUE MANAGEMENT

CROSS-REFERENCE TO RELATED APPLICATIONS

The present application claims the benefit (and is a Continuation) of pending U.S. patent application Ser. No. 16/685,633 titled "Dynamic Queue Management" and filed on Nov. 15, 2019," the entire disclosure of which is incorporated by reference herein.

TECHNICAL FIELD

Embodiments described herein generally relate to methods and systems for data storage and retrieval and, more particularly but not exclusively, to methods and systems implementing queues for data storage and retrieval.

BACKGROUND

Product vendors or other types of service providers often receive large amounts of data from one or multiple customers. These service providers may execute event systems that are tasked with analyzing the received data in accordance with one or more criteria, initiating some type of workflow in response to the analysis, and providing some type of report or summary regarding the received data. Event systems that have downstream batch processing workflows often have to group the received data by various attributes. These attributes can be organization, application, customer, data type, etc.

The act of grouping essentially represents the placement of related events in a queue. However, most available queue systems have a cost associated with the creation of each queue that can hinder the processing of large quantities of data. For queue systems that are dynamic, they often do not have durable persistence. Both types of queue systems are also typically limited in the number of queues and in the number of messages per queue that can be supported.

For example, existing queueing technologies include redis-backed queues that use libraries such as redisson. However, these types of technologies are completely memory-based. This makes these technologies susceptible to, e.g., power failures, which can result in the loss of messages or other types of data.

RabbitMQ® has dynamic queue capabilities as well. However, it is generally difficult to create dynamic queues with RabbitMQ®, as users have to predefine attributes that define the dynamic portion(s) of the queue.

Other existing techniques involve a user creating queues for processing. However, these processes are generally time consuming and labor intensive.

A need exists, therefore, for systems and methods that overcome the disadvantages of existing queueing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of managing queues. The method includes receiving, at an interface, a request to store a message in a queue; storing the message as a row in a key-value store database, wherein the queue is associated with a partition in the database; extracting, using a processor executing instructions stored on memory, at least one attribute from the message; and selecting, using the processor, the message for processing based on the at least one extracted attribute.

In some embodiments, the database includes a plurality of partitions that are each associated with a different queue.

In some embodiments, the at least one attribute includes at least one of age of the message and sensitivity of the message.

In some embodiments, the partition includes a plurality of messages, and the method further includes: performing, using the processor, an attribute analysis on each of the plurality of messages; and elevating for processing a message within the partition based on the attribute analysis.

In some embodiments, the queue is associated with a sort key, and the method further includes associating a unique identifier of the message to the sort key of the queue.

In some embodiments, the method further associating the message with a key unique to the queue. In some embodiments, the key is defined by an organization field and a name field.

In some embodiments, the database includes a plurality of partitions that are each associated with a queue, and the method further includes elevating at least one of the queues for analysis based on a number of messages within the queue and an existence duration of the queue. In some embodiments, the method further includes deprioritizing at least a second queue based on a number of messages within the second queue and an existence duration of the second queue.

According to another aspect, embodiments relate to a system for managing queues.

The system includes an interface for at least receiving a request to store a message in a queue; a key-value store database for storing the message, wherein the queue is associated with a partition in the database; and a processor executing instructions stored in memory configured to extract at least one attribute from the message and select the message for processing based on the at least one extracted attribute.

In some embodiments, the database includes a plurality of partitions that are each associated with a different queue.

In some embodiments, the at least one attribute includes at least one of age of the message and sensitivity of the message.

In some embodiments, the partition includes a plurality of messages and the processor is further configured to perform an attribute analysis on each of the plurality of messages and elevate for processing a message within the partition based on the attribute analysis.

In some embodiments, the queue is associated with a sort key and the method further includes associating a unique identifier of the message to the sort key of the queue.

In some embodiments the processor is further configured to associate the message with a key unique to the queue. In some embodiments, the key is defined by an organization field and a name field.

In some embodiments, the database includes a plurality of partitions that are each associated with a queue, and the processor is further configured to elevate at least one of the queues for analysis based on a number of messages within the queue and an existence duration of the queue. In some embodiments, the processor is further configured to deprioritize at least a second queue based on a number of messages within the second queue and an existence duration of the second queue.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
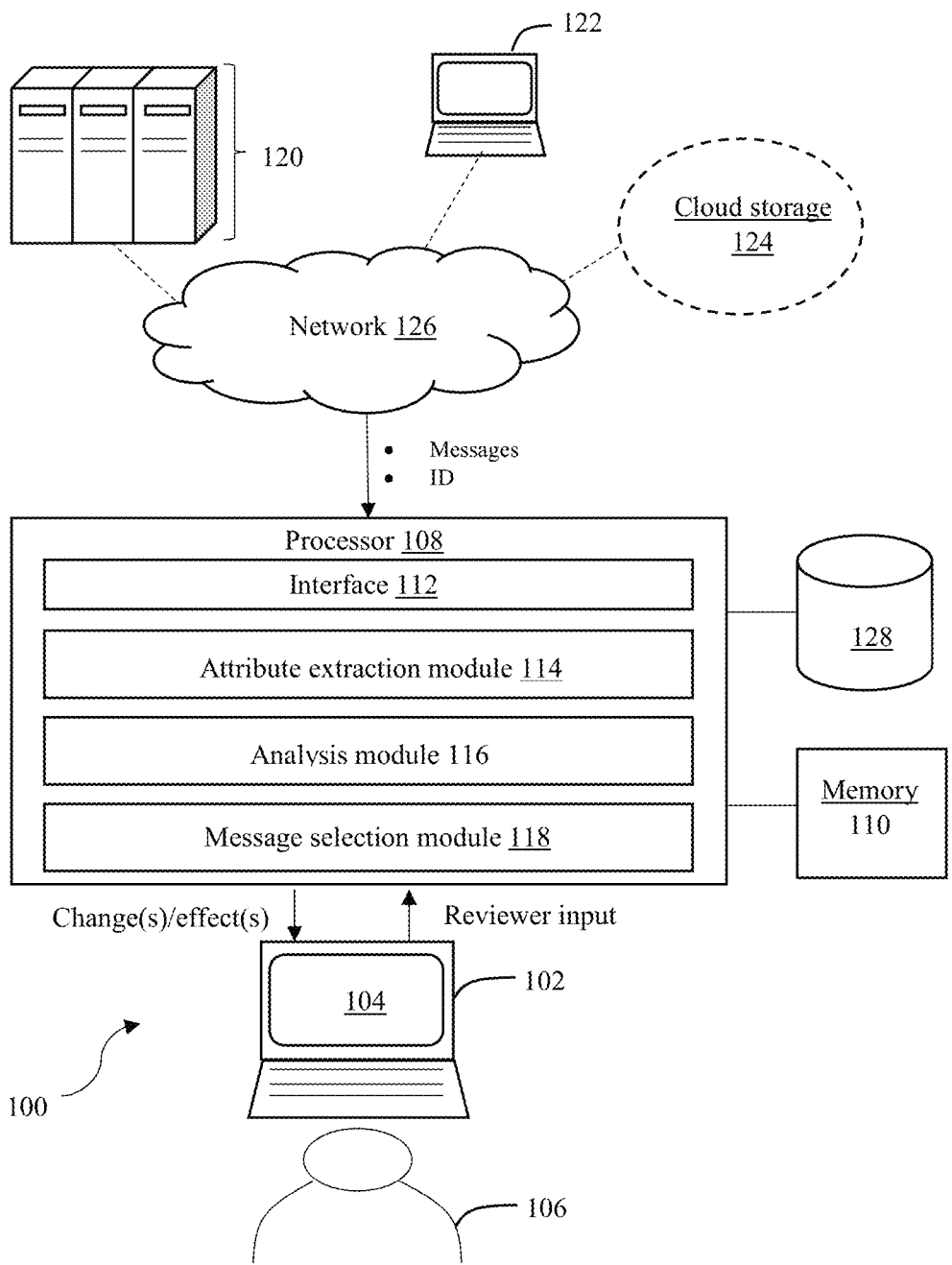
FIG. 1 illustrates a system for managing queues in accordance with one embodiment.

As discussed previously, existing queueing technologies generally are not dynamic in nature and require significant amounts of time to process incoming data. Oftentimes, the order in which the incoming data is processed is static in nature and incoming data is not processed in ways that are necessarily logical or expeditious.

Existing queueing technologies that are dynamic are generally memory-based. This makes these technologies susceptible to power loss or memory failure, which can result in system failure and the loss of messages or other data.

To address these shortcomings, the systems and methods described herein provide a dynamic queueing system that may be based on DynamoDB or another type of key-value store style database. Each row within DynamoDB consists of a partition key and a sort key, followed by any number of key-value attributes that a user may define or that are automatically generated.

In order to present a queue-style interface for a user, a queue-style application programming interface (API) is supplied for interactions with the database. The systems and methods described herein therefore adapt the tabular style format of these key-value databases to present a familiar and easy-to-understand queue style interface for data storage and retrieval.

The first object of the queue interface of the embodiments described herein is the "QueueName" class which may contain two fields: organization and name. Combined, these two fields represent a unique key. This key represents a queue instance that has the ability to hold one or more messages. "Message" is the other object of the queue interface and contains the actual information or data about the event and is associated with a queue via the QueueName object until it is removed from the queue.

All messages may contain a universally unique identifier (for simplicity, "UUID") that maps to the sort key of DynamoDB or other types of key-value pair database structures. The message may also contain or otherwise be associated with any number of attributes to provide additional information about the event to support higher level constructs. These attributes may include, but are not limited to, message priority, message age, or any user-defined content that users wish to provide. The flexibility to associate different types of information with messages allows the systems and methods described herein to implement queue style features such as FIFO (first in, first out), LIFO (last in, first out), and priority-based queues.

Below is a table that shows how messages are adapted for DynamoDB or for another key-value style database for a particular queue:

TABLE 1

| Queue storage configuration | | | | |
| --- | --- | --- | --- | --- |
| Partition Key | Sort Key | AttrA | AttrB | AttrC |
| QueueName | Message UUID | . . . | . . . | . . . |

As seen in Table 1, a queue in DynamoDB may be defined by a partition key. Sort keys are attached to a message's UUID so the association between message and queue is established. The number of attributes and their content are dynamic and can be any number of any type and at any time.

Accordingly, the embodiments described herein allow users to implement a dynamic queue system that can span thousands of potential queues without the need to implement any pre-provisioning of queues. Then, with these various queues, the embodiments described herein may be able to perform differential analysis among queues. As discussed above, the embodiments described herein may be based on DynamoDB or other types of key-value data structures to provide durability, scale, and convenience. This has proven to be a successful use case for batch-style processing systems where data or messages must be grouped by some key before being processed. Messages may also be schema-less, and may be analyzed in conjunction with different queue types such as queue sets, priority-based queues, FIFO queues, LIFO queues, etc.

Additionally, the embodiments described herein offer a number of advantages over existing techniques for managing queues. For example, there is no limit on the number of queues or the number of messages within each queue that may be supported. These embodiments also offer the ability to scale up/down read or write operations via the AWS® Dynamo API, and offer customizable sorting for queues based on statistics such as fairness (discussed below), size, age, or other attributes that may help determine which queue should be processed next. The embodiments described herein also provide for much more durability than existing techniques that are memory-based (e.g., Redisson).

FIG. 1 illustrates a system 100 for managing queues in accordance with one embodiment. The system 100 may include a user device 102 executing a user interface 104 for presentation to one or more users 106 such as a service provider personnel tasked with reviewing and managing incoming data from clients.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106. The user interface 104 may allow the user 106 to specify and view certain queues or messages for analysis, as well as attributes associated with messages.

The user 106 may be an employee of a product vendor or service provider interested in monitoring queues and messages or other data from various clients. The user 106 may rely on the user interface 104 to define or view various attributes associated with received message data. The system 100 reduces the need for the user 106 to manually create queues. Rather, these queues may be automatically generated as the messages are received.

The processor 108 may execute instructions stored on memory 110 to provide various modules to accomplish the objectives of the various embodiments described herein. Specifically, the processor 108 may execute or otherwise include an interface 112, an attribute extraction module 114, an analysis module 116, and a message selection module 118.

The interface 112 may receive messages from one or more clients 120, 122, and 124 over one or more networks 126. The clients 120, 122, and 124 may include servers, devices, storages, or the like, that are associated with clients or customers of a vendor or service provider. For example, the clients 120, 122, and 124 may have hired a vendor associated with the processor 108 to perform some type of analysis on the clients' message data. Each message may be associated with some identification label (ID), such that messages associated with the same client can be grouped together.

The interface 112 may receive messages in batches or otherwise at predetermined time intervals. For example, messages may be communicated to the interface 112 once every hour. The frequency at which messages are sent over the network(s) 126 to the interface 112 may vary and may be determined or set by the user 106 or personnel associated with the clients 120, 122, and 124.

Once received, and before processing, the messages and any associated data may be stored in one or more databases 128. As discussed previously, the database(s) 128 may store the received data in a key-value style format, such as that presented in Table 1 above.

Figure 2:
FIG. 2 illustrates a plurality of partitions associated with a queue in accordance with one embodiment.

Specifically, each row in the database(s) 128 may represent a message. For example, FIG. 2 illustrates a table 200 comprising a plurality of queues with messages that may be stored in one or more databases 128. To avoid "hot" partitions while otherwise collecting statistical information on the queues, the analysis module 116 may reserve partitions specifically for storing statistics. The analysis module 116 may store these statistics as separate rows within the designated statistics partitions.

For example, and as seen in FIG. 2, the analysis module 116 may assign ten partitions for statistics. Each partition may represent a queue or a portion thereof. A queue may be assigned to a particular partition in a sticky fashion, meaning that messages will not be moved from one partition to another. Using a hashing algorithm, the processor 108 may consider the contents of the QueueName value to compute the partition number (i.e., the partition to which a message is assigned). From there, the analysis module 116 may compute and store statistics for the queues.

Figure 3:
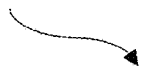
FIG. 3 illustrates an analysis of a key-value store data structure in accordance with one embodiment.
Figure 3:
Figure 3:
Figure 3:
Figure 3:
Figure 3:
Figure 3:

FIG. 3 illustrates the analysis 300 of a key value store 302 in accordance with one embodiment. As seen in FIG. 3, the key value store 302 includes a plurality of keys, one or more messages associated with each queue, and various attributes associated with particular messages. For example, message 1 of Queue 1 has name attributes ("Thomas" and "Jones") and a phone number attribute ("310-355-4444"). Extracted attributes may provide data regarding, for example and without limitation, message size, message age, message priority, message sensitivity (e.g., whether the message contains confidential data), or any other data including user-defined data related to the message(s). The attribute extraction module 114 may extract these types of attributes and provide the attributes to the analysis module 116.

The analysis module 116 may compute statistics on the queues and their contents. Since potentially there can be thousands of queues, a user such as the user 106 may want to know which queues have the most messages as well as which queue(s) should have their messages processed next. Accordingly, users 106 and clients can be assured that messages are processed in an appropriate manner and order.

For example, FIG. 3 also illustrates the key value store 302 being separated into three partitions that are associated with Queue 1 304, Queue 2 306, and Queue 3 308. As seen in FIG. 3, each queue 304, 306, and 308 includes messages from the key value store 302 and attributes associated with the included messages.

The statistics may contain information about a queue, including when it was created, how many messages it contains, the last update time, etc. This allows a user such as the user 106 to find the largest queues by message size or most important queues by fairness. In the context of the present application, the term "fairness" may be based on factors such as the number of messages in a queue and their existence duration. A higher fairness value indicates that the associated queue should be processed next. This allows users to guarantee that smaller queues will not remain unprocessed in favor of, for example, larger and highly-used queues.

The message selection module 118 may also provide various types of queues such as FIFO (first in, first out), LIFO (last in, first out), and priority-based queues. As discussed above, this may be done based on the attributes assigned to every message. For priority-based queues, a user such as the user 106 may provide a value to represent a "priority" attribute. Similarly, attributes reflecting the time of creation of the message may be used to implement LIFO/FIFO functionality.

The queues and their accompanying statistics in the one or more databases 128 may be accessed through an API library 310. A user 312 such as the user 106 of FIG. 1 may then choose or at least monitor which queues (and associated messages) should be processed next.

The user 312 may choose certain queues or messages for processing in accordance with any number of criteria. For example, the user may configure the message selection module 118 to select messages in accordance with specified criterion.

In some embodiments, the message selection module 118 may select the queues with the oldest messages for processing first (i.e., FIFO). As another example, the message selection module 118 may select the queue that has the most messages therein for processing first. In this case, and with reference to FIG. 3, the message selection module 118 would select Queue 1 304 for processing first.

Figure 4:
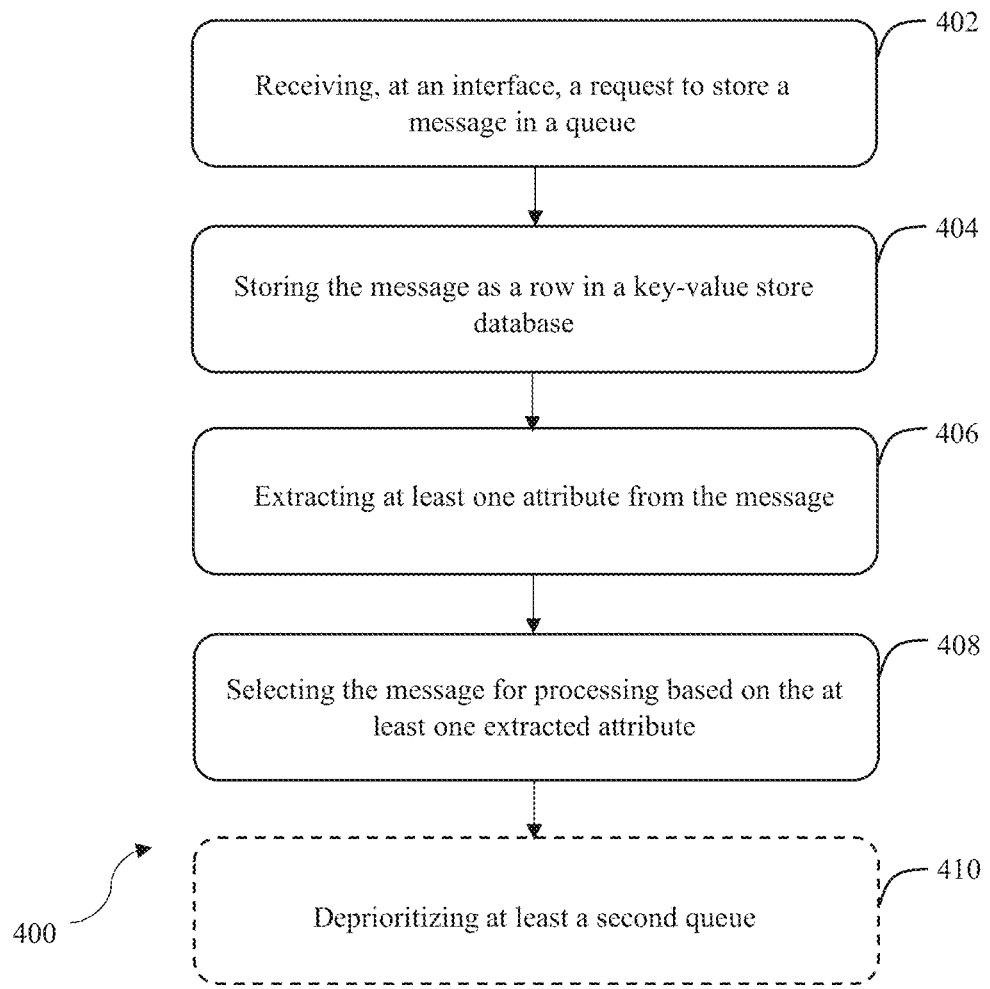
FIG. 4 depicts a flowchart of a method of managing queues in accordance with one embodiment.

FIG. 4 depicts a flowchart of a method 400 of managing queues in accordance with one embodiment. The system 100 or the components thereof of FIG. 1 may perform the steps of method 400.

Step 402 involves receiving, at an interface, a request to store a message in a queue. The message may be received over one or more networks from one or more clients. In this case, a vendor or other type of service provider may be tasked with receiving incoming messages, processing the incoming messages, and then performing some further action. For example, the vendor may be tasked with informing their client that the former detected malicious or otherwise unusual activity in connection with the received message(s).

Step 404 involves storing the message as a row in a key-value store database, wherein the queue is associated with a partition in the database. The incoming message(s) may be stored in a key-value store database until the vendor is able to process the message(s). The database may be divided into a plurality of partitions that each contain one or more messages. This division avoids having too many messages being associated with the same key, and therefore avoids a particular partition or queue becoming "hot" and failing.

Step 406 involves extracting, using a processor executing instructions stored on memory, at least one attribute from the message. An attribute extraction module such as the attribute extraction module 114 may gather certain data related to one or more messages of one or more queues. These attributes may be related to, for example, the age of the message, the size of the message, a priority level of the message, whether the message includes sensitive information, or the like.

Step 408 involves selecting, using the processor, the message for processing based on the at least one extracted attribute. As discussed above, a message may be selected based on the message possessing one or more various attributes. For example, the oldest message in a queue may be selected for processing based solely on the fact that it is the oldest message in the queue. As another example, larger messages may be selected for processing before smaller messages are selected.

Step 410 involves deprioritizing at least a second queue based on a number of messages within the second queue and the existence duration of the second queue. Similar to Step 408, the message selection module 118 may opt to not process a message based on one or more extracted attributes. For example, if the message selection module 118 was configured to process older messages first, the message selection module 118 may specifically deprioritize more recently-received messages so that they are not processed until older messages are processed first.

Accordingly, the systems and methods described herein provide a dynamic queueing system that can support potentially thousands of queues at any time and are able to compare and contrast among queues to make decisions regarding which queue(s) should be processed and in what order.

What is claimed is:

1. A method comprising:
 performing, by a queue management system implemented by one or more computers:
  receiving, at an interface, a request to create a queue to store messages from a client in a sort order;
  creating the queue in a data store, wherein the data store stores a plurality of queues managed by the queue management system, comprising a first queue that stores first messages in a first-in-first-out (FIFO) order based on a creation time attribute of the first messages and a second queue that stores second messages in a last-in-first-out (LIFO) order based on a creation time attribute of the second messages, and wherein the queues are stored on different partitions of the data store determined based on a queue name of individual ones of the queues;
  monitoring one or more statistics of the queue in the data store;
  determining, based on the one or more statistics, that the queue is to be processed next among the plurality of queues; and
  selecting a message from the queue for processing based on the sort order of the queue, wherein the message is processed to detect malicious or unusual activity in connection with the client.

2. The method of claim 1, further comprising performing, by the queue management system:
 elevating the queue for processing based on the one or more statistics; and
 deprioritizing the queue for processing based on the one or more statistics.

3. The method of claim 1, wherein the one or more statistics include one or more of:
 a size of the queue;
 an age of the queue; and
 a last update time of the queue.

4. The method of claim 1, further comprising providing, by the queue management system, values of the one or more statistics via an API of the queue management system.

5. The method of claim 1, further comprising storing, by the queue management system, a message in the queue, wherein the message is stored as a row in a table of the data store, the row including a partition key indicating a partition associated with the queue and a sort key indicating a sort value of the message.

6. The method of claim 5, wherein the partition key uniquely identifies the queue and includes a name of an organization associated with the queue.

7. The method of claim 1, further comprising the queue management system storing the plurality of queues in one table of the data store.

8. The method of claim 1, further comprising storing, by the queue management system, the one or more statistics in one or more reserved partitions of the data store.

9. The method of claim 1, wherein the message is selected from the queue based on one or more attributes extracted from the message.

10. The method of claim 9, wherein the one or more attributes include one or more of:
 a size of the message;
 an age of the message;
 a priority of the message; and
 a sensitivity of the message.

11. A system comprising:
 one or more computers systems that a queue management system, configured to:
  receive, at an interface, a request to create a queue to store messages from a client in a sort order;
  create the queue in a data store, wherein the data store stores a plurality of queues managed by the queue management system, comprising a first queue that stores first messages in a first-in-first-out (FIFO) order based on a creation time attribute of the first messages and a second queue that stores second messages in a last-in-first-out (LIFO) order based on a creation time attribute of the second messages, and wherein the queues are stored on different partitions of the data store determined based on a queue name of individual ones of the queues;
  monitor one or more statistics of the queue in the data store;
  determine, based on the one or more statistics, that the queue is to be processed next among the plurality of queues; and
  select a message from the queue for processing based on the sort order of the queue, wherein the message is processed to detect malicious or unusual activity in connection with the client.

12. The system of claim 11, wherein the queue management system is configured to:
 elevate the queue for processing based on the one or more statistics; and
 deprioritize the queue for processing based on the one or more statistics.

13. The system of claim 11, wherein the one or more statistics include one or more of:

a size of the queue;
an age of the queue; and
a last update time of the queue.

14. The system of claim 11, wherein the queue management system is configured to store the one or more statistics in one or more reserved partitions of the data store.

15. The system of claim 11, wherein to select the message from the queue, the queue management system is configured to:
  extract one or more attributes from the message; and
  select the message from the queue based on the one or more attributes.

16. The system of claim 15, wherein the one or more attributes include one or more of:
  a size of the message;
  an age of the message;
  a priority of the message; and
  a sensitivity of the message.

17. The system of claim 11, wherein the queue management system is configured to store the message in the queue as a table row that includes a partition key indicating a partition associated with the queue and a sort key indicating a sort value of the message.

18. The system of claim 11, wherein the sort key uniquely identifies the message.

19. One or more non-transitory computer-readable media storing program instructions that when executed on or across one or more processors implement a queue management system and cause the queue management system to:
  receive, at an interface, a request to create a queue to store messages from a client in a sort order;
  create the queue in a data store, wherein the data store stores a plurality of queues managed by the queue management system, comprising a first queue that stores first messages in a first-in-first-out (FIFO) order based on a creation time attribute of the first messages and a second queue that stores second messages in a last-in-first-out (LIFO) order based on a creation time attribute of the second messages, and wherein the queues are stored on different partitions of the data store determined based on a queue name of individual ones of the queue;
  monitor one or more statistics of the queue in the data store;
  determine, based on the one or more statistics, that the queue is to be processed next among the plurality of queues; and
  select a message from the queue for processing based on the sort order of the queue, wherein the message is processed to detect malicious or unusual activity in connection with the client.

20. The one or more non-transitory computer-readable media of claim 19, wherein the messages in the queue are schema-less.

\* \* \* \* \*